Nov. 1, 1960  M. SORKIN  2,958,229
VARIABLE SPEED DRIVE
Filed Sept. 4, 1959  3 Sheets-Sheet 1
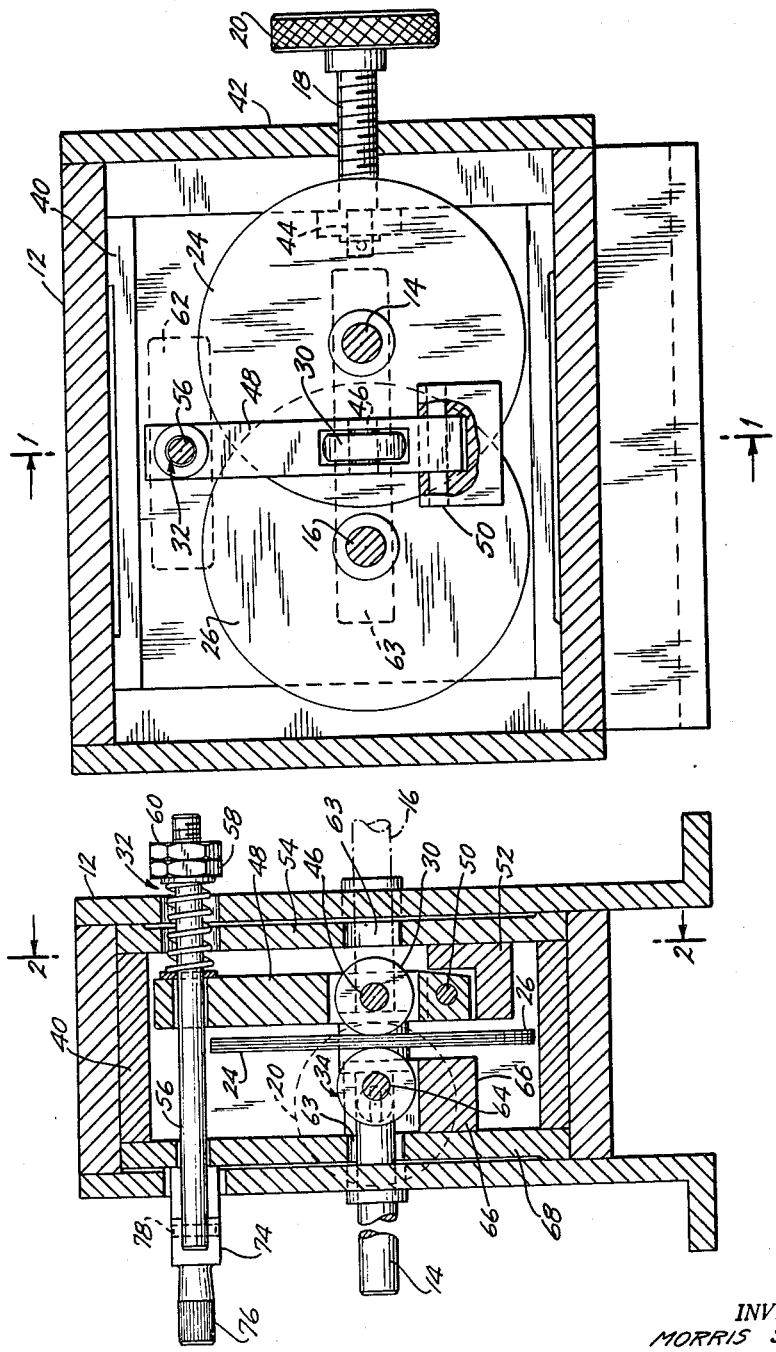
INVENTOR.
MORRIS SORKIN
BY *James and Franklin*
ATTORNEYS

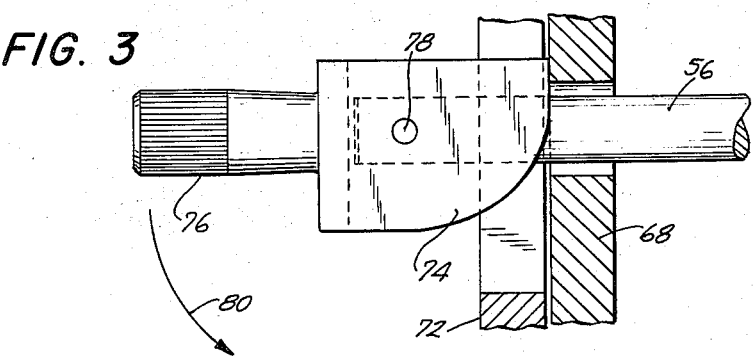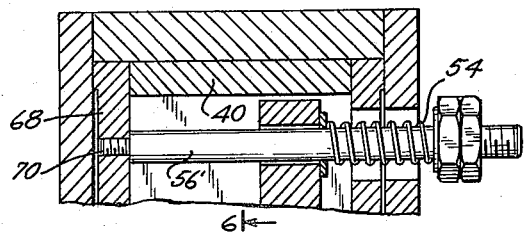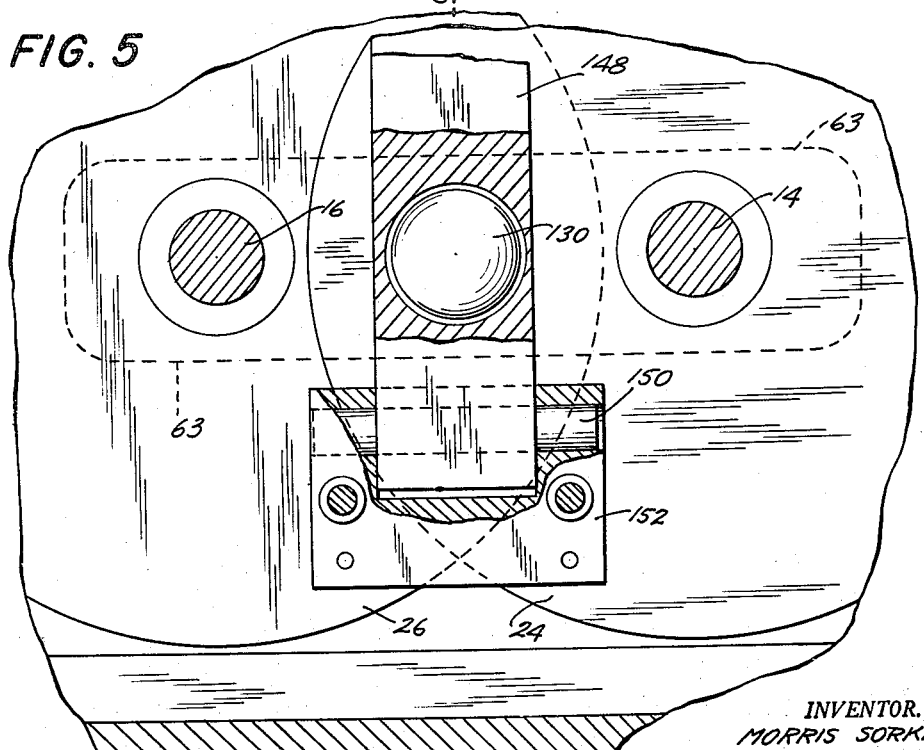

Nov. 1, 1960     M. SORKIN     2,958,229
VARIABLE SPEED DRIVE
Filed Sept. 4, 1959     3 Sheets-Sheet 3
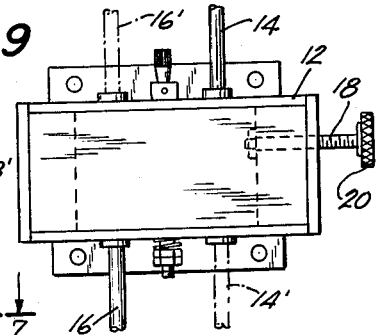
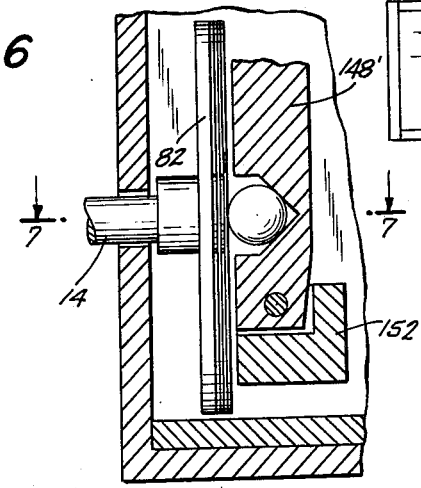
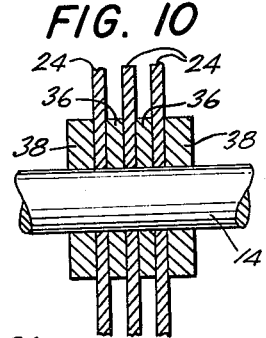
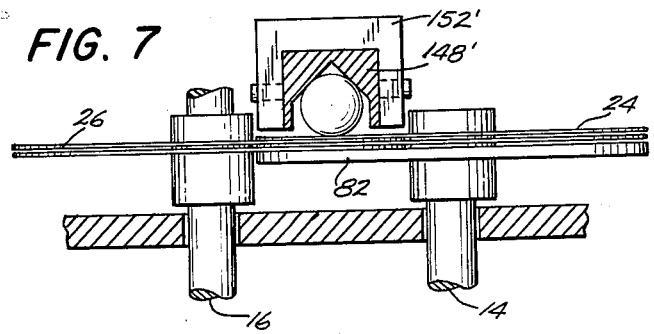
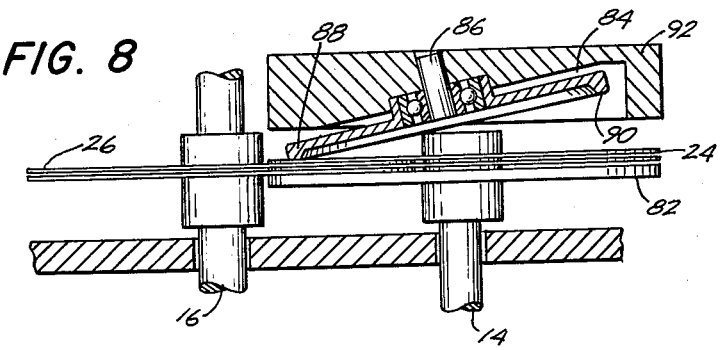
INVENTOR.
MORRIS SORKIN
BY James and Franklin
ATTORNEYS

2,958,229
VARIABLE SPEED DRIVE

Morris Sorkin, 81 Brookview Terrace, Bergenfield, N.J.

Filed Sept. 4, 1959, Ser. No. 838,079

21 Claims. (Cl. 74—199)

This invention relates to variable speed drives, and more particularly to a drive of the continuous or so-called infinitely variable type.

The primary object of the invention is to generally improve continuously variable speed drives. A further object is to provide a novel form of variable speed drive which is relatively simple, compact and inexpensive.

To accomplish the foregoing general objects, and other more specific objects which will hereinafter appear, my invention resides in the variable speed drive elements, and their relation one to another, as are hereinafter more particularly described in the following specification. The specification is accompanied by drawings in which:

Figure 1 is a section through a variable speed drive embodying features of my invention, and is taken approximately in the plane of the line 1—1 of Figure 2;

Figure 2 is a section taken approximately in the plane of the line 2—2 of Figure 1;

Figure 3 is a horizontal fragmentary section drawn to enlarged scale and explanatory of a detail;

Figure 4 is a fragmentary section similar to the upper part of Figure 1 but showing a modification;

Figure 5 is a fragmentary view similar to the center portion of Figure 2, but showing a modified form of the invention using a ball as a roller;

Figure 6 is a section taken approximately in the plane of the line 6—6 of Figure 5;

Figure 7 is a section taken approximately in the plane of the line 7—7 of Figure 6;

Figure 8 is a horizontal section similar to Figure 7 but showing still another modified form of the invention;

Figure 9 is a plan view drawn to reduced scale; and

Figure 10 is explanatory of a detail.

Referring to the drawing, and more particularly to Figure 9, the variable speed drive is here shown enclosed in a housing 12 carrying first and second shafts 14 and 16. These are parallel but displaced from one another. Either shaft may be the input shaft, with the other acting as the output shaft. The shafts are shown extending in opposite directions, but they may be located on the same side of the housing, as indicated by the broken line shaft 14' and the broken line shaft 16'. Thus the shafts may project from one side of the housing, or the other, or both. The speed ratio is varied by means of a screw 18 turned by a suitable crank or knurled knob 20.

Referring now to Figures 1 and 2 of the drawing, the drive comprises a first shaft 14 and a plurality of thin flexible discs 24 secured thereto. The second shaft 16 is in spaced parallel relation and similarly has a plurality of thin flexible discs 26 secured thereto. The radius of the discs is less than the spacing between the shafts 14 and 16, and the discs 24 are interleaved with the discs 26 to form an assembly of overlapping interleaved discs.

A roller 30 bears against one side of the disc assembly between the shafts 14 and 16, and appropriate means, here generally designated 32, cause the roller to exert pressure against the discs. There is also a means 34 on the opposite side of the disc assembly to oppose the pressure of the roller 30, and finally a means here designated 20, to shift the position of the roller 30 toward shaft 14 and away from shaft 16, or vice versa, in order to vary the speed ratio of the drive.

The discs are preferably thin, flexible, hard steel discs, and they are preferably spaced apart somewhat by means of spacers located immediately at the shafts.

This is illustrated in Figure 10 in which discs 24 are separated by spacers 36 between hubs 38. In Figure 10 the thickness of the discs and spacers has been greatly exaggerated. The parts may be secured together by brazing, welding, and the like, and the assembly may be secured to the shaft 14 in any desired fashion, as by means of a pin, key, set screw, or the like. The discs may have a thickness of 0.002" to 0.010", and the spacers have at least the same thickness and preferably a slightly greater thickness, the thickness being increased by the addition of say 0.0005" to 0.0001". The thickness of the discs is related to the radius, and a thickness of say, 0.002" may be used for a radius of 2"; a thickness of 0.003" for a radius of 6"; and a thickness of, say, 0.005" for a radius of 12".

The number of discs used depends on the torque to be transmitted. Theoretically the drive will operate with only one disc on each shaft, but in practice I prefer to use multiple discs on each shaft. One shaft preferably has one disc more than the other shaft, and the end discs of the first shaft constitute the outermost discs. Either shaft may be used as the input shaft, but there is some preference in using the shaft having the outermost discs as the input shaft, so that any friction loss by reason of engagement with the pressure roller will be absorbed from the input rather than from the output.

Reverting now to Figures 1 and 2, the stationary housing 12 carries the shafts 14 and 16, and encloses the discs 24, 26 and the rollers 30, 34. The housing 12 carries a slide 40 which is movable in and guided by the housing for movement in a direction transverse to and in the plane of the shafts. The slide 40 carries the roller 30. The speed adjusting handle 20 with its screw 18 serves to shift the position of the slide 40 and the roller 30 toward one shaft or the other, thereby varying the speed ratio of the drive. In Figure 2 the screw 18 is threadedly received in the housing wall 42, and its inner end is rotatable in, but axially secured to, the slide 40 at 44. If desired, additional means may be provided to lock the adjustment of screw 18, thereby fixing the speed adjustment.

In the particular structure here shown the roller 30 is rotatable on a shaft 46 carried in a generally upright lever 48, the lower end of which is pivoted at 50. The pin 50 is carried in a bracket or block 52 secured to one side wall 54 of the slide 40. The upper end of lever 48 is urged inwardly by a compression spring. This surrounds a pull rod 56, and the pressure exerted by the compression spring is adjustable by means of relatively rotatable screw elements. In the present case the adjustment is made by a nut 58 threaded on rod 56, and the adjustment may be locked by means of a lock nut 60.

Referring now to Figure 2, the housing 12 is slotted as shown at 62, and the slide 40 at 63, to accommodate the horizontal movement of the slide 40, there being no interference by reason of the anchor rod 56 and the shafts 14, 16.

When the means opposing the pressure of roller 30 is another roller 34, as here shown, the latter is rotatable on a shaft 64 (Figure 1) which is carried in a bearing block 66 secured to the sidewall 68 of the slide 40. Thus when the handle 20 is used to change the speed ratio it serves to simultaneously and equally shift both rollers 30 and 34. It will be undertsood that because the discs are thin and flexible, they engage one another loosely except at the point between the squeeze rollers 30 and 34.

These rollers preferably have crowned peripheries in order to narrow the line of engagement or contact between discs, and to thereby minimize sliding friction between the discs. When the pressure roller is half way between the shafts they turn at equal speed. When the pressure roller is nearer shaft 14 it turns at higher speed than shaft 16; and vice versa.

As so far described, the arrangement would be like that shown in Figure 4 of the drawing in which the compression spring 54 is on an anchor rod 56' the other end 70 of which is fixedly secured to the side 68 of the slide 40. If desired, the arrangement may be provided with means to readily release the pressure of spring 54, as for example if the mechanism is going to idle for a long period of time, and it is desired to reduce frictional loss. Such an arrangement is shown in Figures 1 and 3, in which the end of rod 56 passes through the side wall 68 of the slide and through the side wall 72 of the housing, and is secured to a camming block 74 provided with a handle 76. A cross pin 78 connects the parts pivotally, and the radius of the cam is so selected that when the handle 76 is in the position shown, the compression spring is operative, but when the handle is turned about 90 degrees, as indicated by arrow 80, the pressure of the spring is relieved, thereby minimizing friction between the discs.

As so far described, the roller 30 which applies pressure on the discs is a wheel with a crowned rim. However, the roller may also take the form of a ball or sphere, and such an arrangement is illustrated in Figures 5, 6 and 7 of the drawing. In Figure 5 the shafts 14 and 16 carry overlapping interleaved discs 24 and 26 as previously described. Also the roller 130 is carried in a generally upright lever 148 pivoted at 150 in a block 152, as previously described, and while not shown, it will be understood that the upper end of lever 148 is urged inward by a compression spring or other suitable means, the same as in Figure 4 or Figure 1.

The hardened steel ball 130 may rest in a mating pocket as shown in Figures 6 and 7. The advantage of a ball is that it is free to roll in the direction from one shaft to the other when changing the speed adjustment, apart from its freedom to roll in running engagement with the rotating outermost disc.

In Figure 1 the means to oppose the pressure of roller 30 was another like roller 34. Similarly in Figure 5 the ball 130 may be opposed by another like ball, not shown. In either case the pressure of the roller may be opposed in a different way, which is illustrated in Figures 6 and 7, namely, by providing one of the shafts, in this case the shaft 14, with an end disc 82 which is thick and rigid compared to the thin flexible discs previously described. With such an arrangement the thrust of the roller is opposed by the rigid disc 82, and no opposing roller is needed.

The roller so far described, whether a wheel or a ball, is small in diameter. However, it is possible to use a roller which is relatively large in diameter, and which is mounted with its axis lying in the plane of the two shafts, but at an angle to such shafts. Such an arrangement is shown in Figure 8, in which the shafts 14 and 16 carry thin flexible discs 24 and 26 as previously described, but in the present case the roller 84 is a wheel of large diameter mounted with its shaft 86 at an angle, so that only the part 88 of its periphery bears against the discs, the remainder of the roller being remote from the discs as shown at 90.

As before, the roller is carried by a bearing block 92, which may form part of a generally upright lever which is pivoted at one end and acted upon by resilient means at its other end, in order to cause the roller to exert pressure against the faces of the discs. Moreover, as before, the lever 92 is carried in a suitable slide which is slidable relative to the housing, so that the part 88 of the roller may be moved on a line between the shafts, and toward either shaft, thereby varying the speed ratio.

It is believed that the construction and operation of my improved variable speed drive, as well as the advantages thereof, will be apparent from the foregoing detailed description. It will be understood that features shown in one form of the invention are applicable to other forms. For example, the quick release cam device 74, 76, shown in Figure 3, may be applied to a drive using a ball as in Figures 5 to 7, or a sloping wheel as in Figure 8. The rigid backing disc or plate 82, shown (Figures 6-8) in use with a ball or sloping wheel, may equally well be employed with the wheel type roller 30 shown in Figure 1, thereby eliminating the backing roller 34. Conversely, the ball type roller may be backed by another ball type roller instead of by a rigid disc. In all cases, the shafts may project from either side or both sides of the housing.

It will therefore be apparent that while I have shown and described my invention in several preferred forms, changes may be made in the structures shown without departing from the scope of the invention, as sought to be defined in the following claims. In the claims the reference to a "plurality" of thin flexible discs is not intended to exclude the possible use of the theoretical minimum number, that is, a single disc on a shaft.

I claim:

1. A continuously variable speed drive comprising a first shaft, a plurality of thin flexible discs secured thereto, thin annular spacers between said discs around said shaft, a second shaft in spaced relation to the first shaft, a plurality of thin flexible discs secured thereto, thin annular spacers between said discs around said shaft, the discs of one shaft being interleaved with the discs of the other shaft to form as assembly of overlapping interleaved discs, a roller which bears against one side of the disc assembly between the two shafts, means causing said roller to exert pressure against the discs, means on the opposite side of the disc assembly to oppose the pressure of the roller, and means to shift the position of the roller toward one shaft or the other in order to vary the speed ratio of the drive.

2. A continuously variable speed drive comprising a first shaft, a plurality of thin flexible hard steel discs secured thereto, thin spacers between said discs at said shaft, a second shaft in spaced parallel relation to the first shaft, a plurality of thin flexible hard steel discs secured thereto, thin spacers between said discs at said shaft, the discs of one shaft being interleaved with the discs of the other shaft to form an assembly of overlapping interleaved discs, a roller which bears against one side of the disc assembly between the two shafts, means causing said roller to exert pressure against the discs while in rolling engagement therewith, means on the opposite side of the disc assembly to oppose the pressure of the roller, and means to shift the position of the roller toward one shaft or the other in order to vary the speed ratio of the drive.

3. A continuously variable speed drive comprising a first shaft, a plurality of thin flexible discs secured thereto, thin annular spacers between said discs around said shaft, a second shaft in spaced relation to the first shaft, a plurality of thin flexible discs secured thereto, thin annular spacers between said discs around said shaft, the discs of one shaft being interleaved with the discs of the other shaft to form an assembly of overlapping interleaved discs, a roller which bears against one side of the disc assembly between the two shafts, means causing said roller to exert pressure against the discs, means on the opposite side of the disc assembly to oppose the pressure of the roller, a housing carrying said first and second shafts and enclosing said discs and roller, a slide movable in and guided by said housing in a direction transverse to and connecting the shafts, said slide carrying said roller, and means including a screw for shifting the position of the slide and roller toward one shaft or the other in order to vary the speed ratio of the drive.

4. A continuously variable speed drive as defined in claim 1, in which the means to oppose the pressure of the roller is itself another roller disposed on the opposite side of the disc assembly, and in which the means to change the speed ratio serves to simultaneously equally shift the position of both rollers.

5. A continuously variable speed drive as defined in claim 2, in which the means to oppose the pressure of the roller is itself another roller disposed on the opposite side of the disc assembly, and in which the means to change the speed ratio serves to simultaneously equally shift the position of both rollers.

6. A continuously variable speed drive as defined in claim 5, in which the rollers are hardened steel wheels with crowned perimeters.

7. A continuously variable speed drive as defined in claim 3, in which the means to oppose the pressure of the roller is itself another roller disposed on the opposite side of the disc assembly, and in which the slide carries both rollers, and in which the slide and screw which change the speed ratio serve to simultaneously equally shift both rollers.

8. A continuously variable speed drive as defined in claim 2, in which the roller is a hardened steel wheel with a crowned perimeter.

9. A continuously variable speed drive as defined in claim 1, and in which the roller is a ball or sphere mounted for free rotation in all directions.

10. A continuously variable speed drive as defined in claim 2, and in which the roller is a ball or sphere mounted for free rotation in all directions.

11. A continuously variable speed drive as defined in claim 1, in which the roller is a rigid wheel having a substantial diameter, and which is mounted with its axis lying in the plane of the two shafts, but at an angle to said shafts.

12. A continuously variable speed drive as defined in claim 2, in which the roller is a rigid wheel having a substantial diameter, and which is mounted with its axis lying in the plane of the two shafts, but at an angle to said shafts.

13. A continuously variable speed drive as defined in claim 1, in which the means to oppose the pressure of the roller is a relatively thick rigid disc secured to one of the two shafts.

14. A continuously variable speed drive as defined in claim 2, in which the means to oppose the pressure of the roller is a relatively thick rigid disc secured to one of the two shafts.

15. A continuously variable speed drive as defined in claim 1, in which the means for exerting a drive pressure on the roller is a compression spring, and in which the pressure exerted by the compression spring is adjustable by means of relatively rotatable threaded elements.

16. A continuously variable speed drive as defined in claim 2, in which the means for exerting a drive pressure on the roller is a compression spring, and in which the pressure exerted by the compression spring is adjustable by means of relatively rotatable threaded elements.

17. A continuously variable speed drive as defined in claim 1, in which the means for exerting a drive pressure on the roller is a compression spring, and in which a readily releasable means and handle are provided for quick release of the spring pressure when the drive means is to be disengaged without stopping rotation of the input shaft.

18. A continuously variable speed drive as defined in claim 2, in which the means for exerting a drive pressure on the roller is a compression spring, and in which a readily releasable means and handle are provided for quick release of the spring pressure when the drive means is to be disengaged without stopping rotation of the input shaft.

19. A continuously variable speed drive as defined in claim 1 in which the means for exerting a drive pressure on the roller is a compression spring, and in which the pressure exerted by the compression spring is adjustable by means of relatively rotatable threaded elements, and in which a readily releasable means and handle are provided for quick release of the spring pressure when the drive means is to be disengaged without stopping rotation of the input shaft.

20. A continuously variable speed drive as defined in claim 2 in which the means for exerting a drive pressure on the roller is a compression spring, and in which the pressure exerted by the compression spring is adjustable by means of relatively rotatable threaded elements, and in which a readily releasable means and handle are provided for quick release of the spring pressure when the drive means is to be disengaged without stopping rotation of the input shaft.

21. A continuously variable speed drive comprising two shafts carrying a plurality of flexible interleaved discs secured to the two shafts in spaced relation for relatively free rotation of one shaft with respect to the other, said shafts having thin annular spacers therearound between said discs to help insure free rotation of one shaft with respect to the other, pressure means to compress a part of the interleaved area of the disc assembly in order to cause a point of driving engagement, and means to shift the position of said pressure means with respect to the two shafts in order to vary the speed ratio of the drive.

References Cited in the file of this patent

UNITED STATES PATENTS

| 755,616   | Cheyne  | Mar. 29, 1904 |
| 1,317,916 | Ford    | Oct. 7, 1919  |
| 2,862,395 | Gunther | Dec. 2, 1958  |

FOREIGN PATENTS

| 392,917 | Great Britain | May 24, 1933 |